United States Patent [19]
Farrell

[11] 3,836,300
[45] Sept. 17, 1974

[54] STRIPPING ACTUATOR FOR MOLDING MACHINE

[75] Inventor: John J. Farrell, Green Brook, N.J.

[73] Assignee: Farrell Patent Company, Dunellen, N.J.

[22] Filed: June 25, 1973

[21] Appl. No.: 372,921

[52] U.S. Cl.............. 425/165, 425/139, 425/436, 425/DIG. 232
[51] Int. Cl. ............................................ B29c 7/00
[58] Field of Search........ 425/436, 242, 326 B, 139, 425/165, DIG. 232, 249

[56] References Cited
UNITED STATES PATENTS

| 3,081,486 | 3/1963 | Skvore | 425/436 X |
| 3,690,799 | 9/1972 | Johnson | 425/249 X |
| 3,778,210 | 12/1973 | Heath, Jr. et al. | 425/326 B X |

Primary Examiner—Frank T. Yost
Attorney, Agent, or Firm—Sandoe, Hopgood & Calimafde

[57] ABSTRACT

The stripping of a blow molding machine has to be adjustable to accommodate the length of the core rods on which articles are molded and to accommodate the length of the articles. This invention provides means, spaced from the stripper mechanism, and at a location for convenient access by an operator for adjusting the stroke of the stripper mechanism. Oscillating motion of the stripper is converted into rotary motion of a disc through less than 360°, and there are actuators adjustably connected with the disc for moving control units (switches) that control the stripper stroke.

14 Claims, 6 Drawing Figures

PATENTED SEP 17 1974    3,836,300

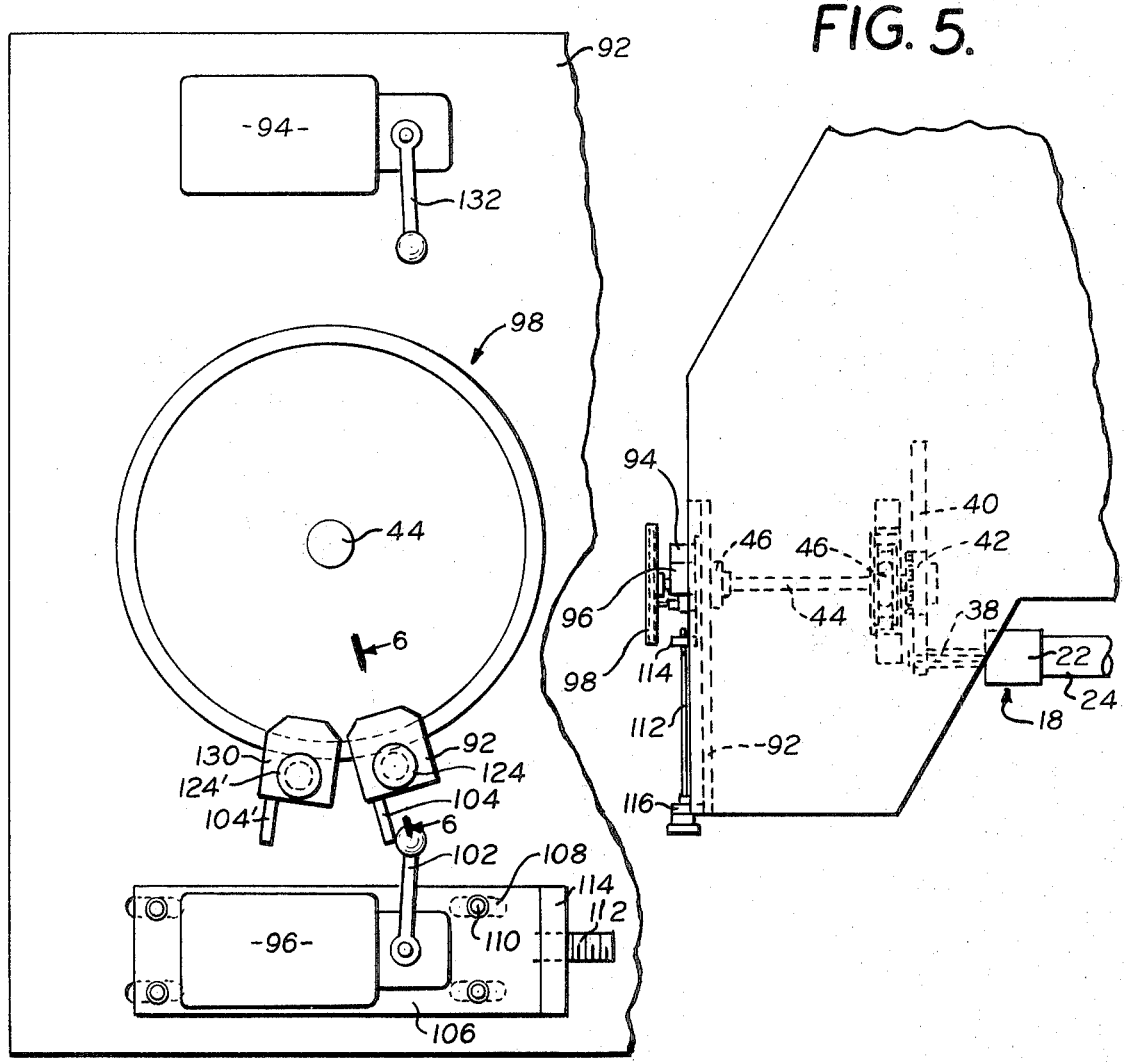
FIG. 4.
FIG. 5.
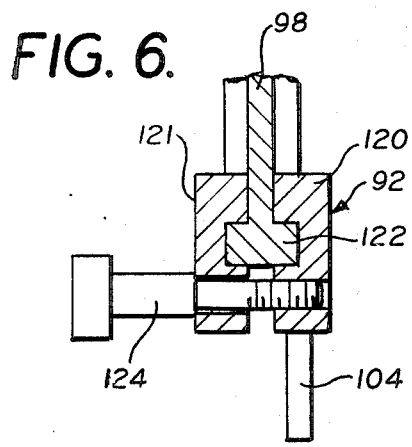
FIG. 6.

STRIPPING ACTUATOR FOR MOLDING MACHINE

BACKGROUND AND SUMMARY OF THE INVENTION

The last station on a molding machine is the stripper station at which molded articles are removed from the supports on which they were molded. The invention will be described as applied to a blow molding machine in which an indexing head has three faces with core rods extending from each face. There are three stations located at 120° spacing around the indexing head. These stations include an injection mold station; a blowing mold station and a stripper station. The indexing head moves intermittently through angles of 120° to shift a group of core rods from one station to the next.

When the molds open, the indexing head rises sufficiently to permit the core rods to clear the cavities in the lower portions of the molds and after the indexing head has turned 120°, the indexing head comes down again to bring the core rods into the cavities of the injection mold and blowing mold and to lower the core rods into position in which a stripper element with clearance for each core rod has portions close to the sides of the core rods for pushing the molded articles from the core rods as the stripper element moves away from the indexing head.

The stripper element is on a frame which swings angularly about fulcrum bearings at the lower end of the frame. This swinging movement causes the upper end of the frame with the stripper element to move angularly through a stroke which must be long enough to push the molded articles from the core rods or the supports on which they were molded. The stroke of the stripper element must be adjustable to accommodate core rods of different length and molded articles of different size which are made when the molding machine is used with different molds depending upon the article to be molded.

This invention provides improved means for adjusting the stroke of the stripper element; and for making the adjustment more conveniently and more accurately.

The invention converts the oscillating movement of the stripper element frame into a rotary angular movement and this movement shifts one or more actuators through angular displacements dependent upon the stroke of the frame of the stripper element. The actuators cause one or more control units to be operated to stop and/or reverse the stripper element when it has travelled for a predetermined distance and through a stroke coordinated with the position of the molded articles when brought to the stripper station.

One of the principal advantages of the present invention is that the adjustable elements for controlling the stripper stroke are located at one end of the side of the molding machine where the stripper station is positioned; and they are located so as to be conveniently accessible to an operator so that the adjustments can be made easily and with great accuracy.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 4 is a greatly enlarged view taken on the line 4—4 of FIG. 1;

FIG. 5 is a fragmentary top plan view of the stroke adjusting mechanism shown in FIG. 1; and FIG. 6 is a greatly enlarged sectional view taken on the line 5—5 of FIG. 4.

DESCRIPTION OF PREFERRED EMBODIMENT

Figure 1:
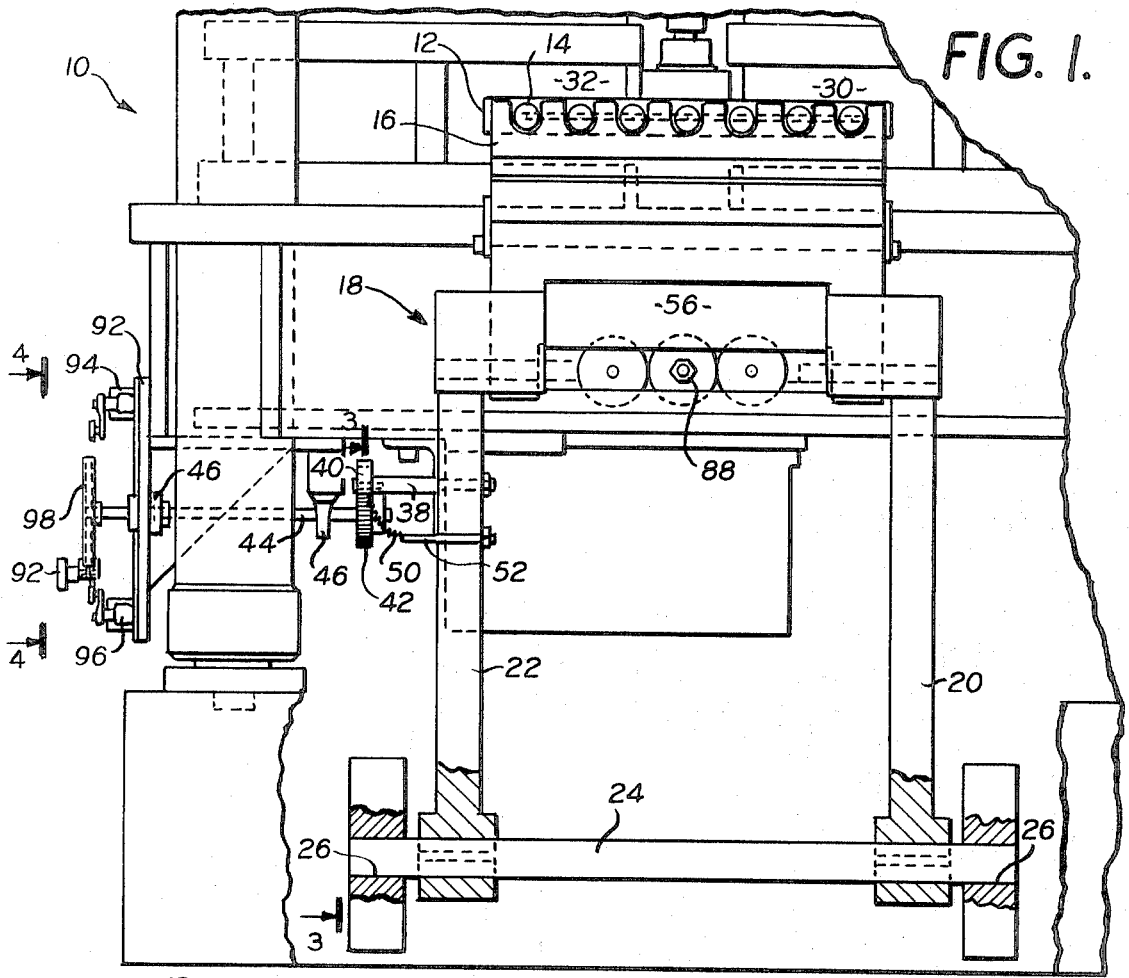
FIG. 1 is a fragmentary diagrammatic view of the stripper station on a molding machine.

FIG. 1 shows a molding machine 10 which has an indexing head 12 from which seven core rods 14 extend. These core rods extend through depressions in a stripper element 16 carried at the upper end of a frame 18 having side portions 20 and 22 which extend downwardly to a shaft 24 supported in fulcrum bearings 26 attached to the fixed part of the molding machine 10.

The indexing head 12 may be of triangular shape with other core rods projecting toward an injection mold 30 and still others projecting from a third face into cavities of a blowing mold 32. The molding machine structure thus far described is conventional and no more detailed description of it is necessary for a complete understanding of this invention.

Figure 3:
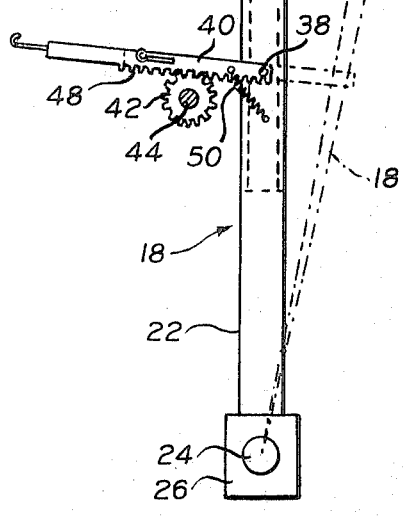
FIG. 3 is a fragmentary diagrammatic view taken on the line 3—3 of FIG. 1.

FIG. 3 shows the frame 18 in full lines with the stripper element 16 extending upwardly alongside of one of the core rods 14 which projects from the indexing head 12. A blown article 36 is shown on the core rod 14. When the frame 18 rocks clockwise on its shaft 24 and fulcrum bearing 26, the stripper element 16 moves into the dot-and-dash line position shown in FIG. 3 and this pushes the blown article 36 off the core rod 14 on which it was molded. The blown article 36 drops into a receptacle located at the stripper station for receiving articles that are stripped from the core rods.

Referring again to FIG. 1, there is a stud 38 extending from one side of the left hand portion 22 of the frame 18.

A link 40 is pivotally connected to the stud 38; and this link 40 extends across the top of a gear 42 which is secured to a shaft 44 that turns in bearings 46 that are attached to fixed portions of the molding machine.

There are teeth 48 (FIG. 3) formed in the lower side of the link 40 in position to engage the teeth of the gear 42. A spring 50 is attached to the link 40, at a location spaced from the stud 38, and this spring 50 is connected at its other end to a second stud 52 which serves as an anchor for the end of the spring remote from the link 40. The spring 50 is under tension and holds the link down in mesh with the gear 42 at all times.

The rocking movement of the frame 18 between the full line position shown in FIG. 3 and the dot-and-dash line position causes the link 40 to move longitudinally across the gear 42 and to rotate the gear 42 through angular movements proportional to the movement of the link 40 and the frame 18. The number of teeth in the gear 42 is proportioned to the angular movement of the frame 18 so as to cause rotary movement of the shaft 44 less than one full revolution of the shaft. The reason for this limited rotation of the shaft 42, in the preferred embodiment of the invention, will be explained later in connection with FIGS. 4 and 5.

Figure 2:
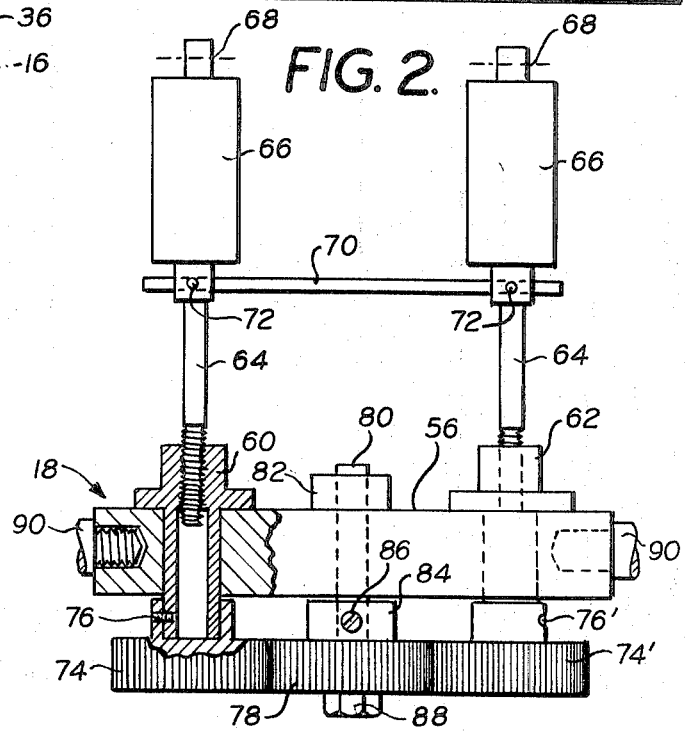
FIG. 2 is a greatly enlarged view taken on the line 2—2 of FIG. 1.

The apparatus for causing the frame 18 to rock back and forth on the fulcrum bearings 26 is illustrated in FIG. 2. Near the upper end of the side portions 20 and 22 of the frame 18, there is a block 56 which forms part of the frame 18. There are two bushings 60 and 62 extending through the block 56. These bushings 60 and 62 have threaded portions into which screw the ends of piston rods 64. The piston rods extend from motors 66 which are pivotally connected to the fixed part of the molding machine 10 by connecting pins shown diagrammatically in FIG. 2 and indicated by the reference characters 68. A bar 70 is connected to both of the piston rods 64 by pins 72 for the purpose of preventing the piston rods 64 from rotating.

When the bushings 60 and 62 are rotated, they screw one way or the other along the piston rods 64 to change the distance between the motors 66 and the block 56. This changes the position of the stripper mechanism when the pistons in the cylinders 66 are at the opposite ends of their strokes. The stripper mechanism can thereby be adjusted to accommodate core rods of different length and molded articles which extend to different limits on the core rods.

FIG. 2 also shows the mechanism for rotating the bushings 60 and 62 so as to screw the bushings along the piston rods 64. There is a gear 74 which fits over the forward end of the bushing 60 and which is secured to the bushing 60 by a set screw 76. A similar gear 74' is secured to the bushing 62 by a set screw 76'. The shoulders of the gears 74 and 74' extend close to the block 56 and provide thrust bearings for preventing the bushings 60 and 62 from moving axially with respect to the block 56.

The gears 74 and 74' can be rotated by turning a center gear 78 which meshes with both of the gears 74 and 74' at all times. This gear 78 has an axle 80 extending through the block 56 and there is a collar 82 for preventing the shaft 80 from moving toward the front of the block 56, while a shoulder 84 on the shaft 80 prevents the shaft from moving in the opposite direction. A set screw 86 secures the gear 78 to the shaft 80.

There is a stud 88 of hexagonal cross section extending from the front of the gear 78. By applying a wrench to the stud 88, the gear 86 can be rotated in either direction to rotate the gears 74 and 74'. Because of the fact that these gears 74 and 74' mesh with opposite sides of the center gear 88, rotation of the center gear causes the side gears 74 and 74' to both rotate in the same direction with respect to one another.

The mechanism shown in FIG. 2 is used to adjust the position of the stripper element when it is at the extreme ends of its stroke as determined by the full stroke of the motors 66. Other means are provided, as will be described, for changing the stroke of the stripper element so that it does not move to the ultimate limits which the motors 66 would determine, in cases where a stroke of such length is unnecessary. The block 56 is connected with the rest of the stripper frame 18 by shoulder screws 90.

Referring to FIGS. 1 and 4, a fixed plate 92 is attached to one side of the molding machine. There are control units including electric switches 94 and 96 attached to the fixed plate 92.

At the end of the shaft 44, there is a carrier plate or disc 98 which is fixed to the shaft 44 so as to rotate with the shaft. An actuator unit 92 is adjustably connected with the disc 98 in position to actuate the switch 96.

FIG. 4 shows the switch 96 on a larger scale. This switch has an operating arm 102 which extends into the path of an abutment 104 of the actuator 92. Whenever the disc 98 rotates counterclockwise far enough to bring the abutment 104 into the position shown in FIG. 4, the abutment 104 moves the arm 102 to operate the switch 96. This switch 96 controls the stopping of the motors that pull the stripper frame back toward the molding machine. In the preferred construction, the switch 96 controls electrically operated valves to shut off the flow of working fluid to the cylinder and piston motors 66 (FIG. 2) which moves the stripper frame 18 toward the motors 66.

The switch 96 has a base 106 by which it is connected to the fixed plate 92. This base 106 has slots 108 through which screws 110 extend and thread into the fixed plate 92. When the screws 110 are tight, the base 106 is held in an immovable position on the fixed plate 92.

The slots 108 permit adjustment of the base 106 and the switch 96 in the direction of extent of the slots 108 when the screws 110 are loose. This adjustment is effected by a screw 112 which threads through a lug 114 extending outwardly from the base as is best shown in FIG. 6. The screw extends through another lug 116 which projects from a fixed part of the plate 92. There are collars on the screw 112 to prevent it from moving axially with respect to the lug 116. Rotation of the screw 112, therefore, causes the screw threads in the lug 114 to move the control switch 96 toward and from the fixed lug 116, depending upon which way the screw 112 is rotated.

The actuator 92 has clamping jaws 120 and 121 (FIG. 5). These clamping jaws 120 and 121 fit around a rim 122 which extends around the circumference of the disc 90. The clamping jaws 120 and 121 are pulled together by a shoulder screw 124. Whenever it is desirable to move the actuator 92 to a different position around the rim 122, the shoulder screw 124 is loosened and the clamping jaws 121 and 121 are made to slide along the rim 122 as far as necessary to obtain the desired position of the actuator 92 on the circumference of the disc 98.

Movement of the actuator 92 around the rim 122 changes the time, in the stroke of the stripper element at which the actuator arm 104 will move the switch arm 102 to operate the switch 96.

Approximate timing of the operation of the switch 96 can be obtained by putting the molding machine at the approximate position where it is desirable to have the stripper element stop, preparatory to a new stroke; and then adjust the actuator 92 so that it is in position to operate the switch 96. If this adjustment is not sufficiently accurate, micrometer accuracy can be obtained by loosening the screws 110 and making the final adjustment by rotation of the lead screw 112 which moves the switch 96 with respect to the disc 98 along a path parallel to a tangent to the disc. When the desired position has been reached, the switch 96 is locked in position by tightening the screws 110.

There is another actuator 130 which has the same construction as the actuator 92 and for which the corresponding parts are designated in FIG. 4 by the same reference characters with a prime appended.

The actuator 130 operates the switch 94 which has a switch arm 132, corresponding to the switch arm 102 of switch 96; and which is located in the path of movement of the abutment 104' of the switch actuator 130. This control switch 94 is used to stop the stripping stroke of the stripper mechanism and for reversing the stroke to bring the stripper element back after the articles formed on the core rods have been stripped from the rods.

The switch 94 can be provided with a base and with a micrometer adjusting screw for effecting the last part of the adjustment, if desired; but since the operation at this end of the stripper element stroke is not as critical as the beginning of the stroke, no screw adjustment for the switch 94 is shown in the drawing.

It will be apparent from FIG. 4 that the disc 98 cannot rotate through a full revolution because the actuators 92 and 130 are both located on the same rim of the disc 98. If, for any reason it is desirable to have a control which makes more than one revolution in response to the rocking movement of the stripper frame, other ways of actuating the switches 94 and 96 can be utilized.

However, the amount of rotation of the shaft 44 and consequent rotation of the disc 98 can be made as small or as large as desired for any given angle of rocking movement by the stripper frame by merely locating the shaft 44 and the gear 42 (FIG. 3) at a higher or lower level with respect to the fulcrum bearing 26. The lower the link 40, gear 42 and shaft 44 are located along the frame 18, the smaller the angle of rotation of the shaft 44 becomes for any given angle of rocking movement of the frame 18.

Referring again to FIG. 1, it will be evident that the disc 98, the actuator 92 and other actuator on this disc 98, and the switches 94 and 96 are all located at the end of the side of the machine on which the stripper station is located. Thus all of the adjustments are at a place which is conveniently accessible to an operator of a machine and substantial time can be saved when adjustments have to be changed to accommodate new molds and core rods for making different articles.

The preferred embodiment of the invention has been illustrated and described, but changes and modifications can be made and some features can be used in different combinations without departing from the invention as defined in the claims.

What is claimed is:

1. In a molding machine that has a stripper station with elements for stripping molded articles from the supports on which they were molded, the stripper station including a frame that moves back and forth through a stroke for each stripping operation, a shaft, motion-transmitting connections through which movement of the frame imparts rotary movement to the shaft about its longitudinal axis, a control unit for limiting the stroke of the frame in one direction, an actuator unit for the control unit, one of said units being connected with the shaft for angular movement therewith, and the other unit being at a relatively fixed location in the path of the unit that moves with the shaft for contact of said units with one another, and adjustment means for changing the relative position of one of the units with respect to the other unit to change the amount of angular movement of the shaft required to bring the units in contact with one another.

2. The molding machine construction described in claim 1 characterized by the motion-transmitting connections being gearing, and the actuator unit being connected with the shaft.

3. The molding machine construction described in claim 2 characterized by the motion-transmitting connections including an element that moves with the frame and that has gear teeth on one side thereof and including also a gear secured to the shaft in position to mesh with the gear teeth on the element that moves with the frame, fixed bearings in which the shaft turns, a carrier plate secured to the shaft at a location remote from the gear, the actuator unit being on the carrier plate.

4. The molding machine construction described in claim 3 characterized by fulcrum bearings on which the frame rocks at one end to move the other end through a stroke, the element that moves with the frame being spaced from the fulcrum bearings by a distance that is coordinated with the gear teeth to limit the rotation of the shaft to less than one revolution for the stroke of the frame.

5. The molding machine construction described in claim 2 characterized by fulcrum bearings on which the frame rocks back and forth with angular movement through its stroke, the motion-transmitting connections including a gear on the shaft, a link pivotally connected with the frame and having teeth on one side thereof in mesh with the gear on the shaft, resilient means holding the teeth on the link in mesh with the gear during rocking movement of the frame to impart rotary movement to the gear and shaft, relatively fixed bearings in which the shaft rotates, the shaft extending for a substantial distance beyond the stripper station frame and to a side of the molding machine that is easily accessible to an operator, a disc secured to the shaft, the actuator unit being adjustably connected to the disc, and the control unit being an electric switch in a relatively fixed position with respect to the side of the molding machine.

6. The molding machine construction described in claim 5 characterized by the disc having a circumferential rim, and the actuator having a clamping portion that grips the rim to hold the actuator in fixed position on the disc, the clamping portion being releasable for shifting the actuator unit into different positions along the rim.

7. The molding machine construction described in claim 6 characterized by there being two actuator units on the rim of the disc and each of which has releasable clamping means for adjusting the actuator circumferentially along the rim independently of the other actuator, and two control units at angularly spaced locations around the disc for actuation by the respective actuators.

8. The molding machine construction described in claim 7 characterized by the molding machine being a blow molding machine with an indexing head that makes successive angular movements, the supports for the molded articles being core rods extending from faces of the indexing head, the stripping station being the next station after the blowing station in the direction in which the indexing head turns, motor means having a fixed stroke, connections between the motor means and the frame, said connections between the motor means and the frame being adjustable to change the positions of the frame for successive positions of the motor means and thereby adjust the frame stroke to accommodate different lengths of core rods and blown articles on the core rods, one of the control units being a switch that stops and reverses the motor means at the end of the stroke that completes the stripping of the blown articles from the core rods, and the other of the control units being a switch that stops the motor means at the end of its stroke from which it will start a subsequent stripping operation.

9. The molding machine construction described in claim 1 characterized by motor means that moves the frame back and forth through its stroke, and the control unit including an electric switch that stops and reverses the motor means at the end of the stroke that strips the molded articles from the supports on which they are molded.

10. The molding machine construction described in claim 1 characterized by the shaft extending beyond one end of the side of the machine on which the stripper station is located and to a location that is conveniently accessible to an operator, a carriage plate at the end of the shaft beyond said end of the side of the machine, the actuator unit being adjustably connected with the carriage plate to change the position of the actuator unit with respect to the angular position of the carriage plate and the shaft.

11. The molding machine construction described in claim 10 characterized by the control unit being connected to a fixed part of the molding machine by fastening means that are adjustable to change the position of the control unit in directions transverse of the axis of the shaft.

12. The molding machine construction described in claim 11 characterized by the carriage plate being a disc having a circumferential rim, and the actuator unit having a clamping portion that grips the rim to hold the actuator in fixed positions on the disc rim, the clamping portion being releasable for shipping the actuator unit into different positions along the rim.

13. The molding machine construction described in claim 12 characterized by the control unit being connected with the molding machine by releasable fastening means extending through slots in the control unit, and a screw extending through an opening in the control unit in the direction of the desired adjustment of said control unit, a lug on a side of the molding machine, said screw extending through an opening in said lug, one of the openings being threaded whereby rotation of the screw moves the control unit toward and from the lug to adjust the control unit with respect to the disc.

14. The molding machine construction described in claim 13 characterized by two similar actuators on the disc rim, two control units each of which is a switch with an operating arm extending into the path of one of the actuators, both of the actuators being similarly adjustable along the rim of the disc and both of the switches being adjustable in directions parallel to tangents to the circumference of the disc.

* * * * *